United States Patent [19]

Kaganas et al.

[11] Patent Number: 4,669,779
[45] Date of Patent: Jun. 2, 1987

[54] SEAT COVER

[75] Inventors: Jose Kaganas, Golden Beach; Stewart Wallach, Coral Gables, both of Fla.

[73] Assignee: Sagaz Industries, Inc., Miami, Fla.

[21] Appl. No.: 882,628

[22] Filed: Jul. 7, 1986

[51] Int. Cl.⁴ .............................................. A47C 27/00
[52] U.S. Cl. ..................................... 297/229; 297/224
[58] Field of Search ............... 297/229, 219, 223, 224, 297/225

[56] References Cited

U.S. PATENT DOCUMENTS

| 3,804,457 | 4/1974 | Hellman | 297/219 |
| 4,396,227 | 8/1983 | Neilson | 297/219 |

FOREIGN PATENT DOCUMENTS

| 208725 | 9/1959 | Austria | 297/229 |
| 1100158 | 3/1955 | France | 297/229 |
| 303939 | 9/1968 | Sweden | 297/219 |

Primary Examiner—James T. McCall
Attorney, Agent, or Firm—John H. Faro

[57] ABSTRACT

An improved one-piece seat cover for an automotive passenger seat is disclosed. This improved one-piece seat cover is superior to seat covers presently available in that the portion thereof which covers the seat cushion is secured and maintained taut and wrinkle free without coupling to the springs of the seat cushion. The improvement resides in the provision of an additional panel which extends from the inside seam that joins the back portion of the cover to the seat portion of the cover. This panel extends from this inside seam of the cover between the seat back and seat cushion. Resilient hold down straps on the seat cover portion are then coupled to this panel under the base of the seat by tensioning means. Thus, the seat cover cushion is maintained secure and in place independent of the position of the seat cushion or the springs which support the seat cushion. In an alternative embodiment of this invention, the seat back portion of the cover is also modified. This modification is made to accommodate the use of natural seat covering materials (i.e. animal hides-leather, mouton lamb skins, etc.) in a seat cover having universal application. This modification involves the replacement of the rear panel of the seat back portion of the cover with a fabric panel capable of resilient stretch in multiple dimensions. This fabric panel thus permits a single seat covering design to adapt to seats of different sizes and shapes while still retaining a custom tailored appearance.

4 Claims, 5 Drawing Figures

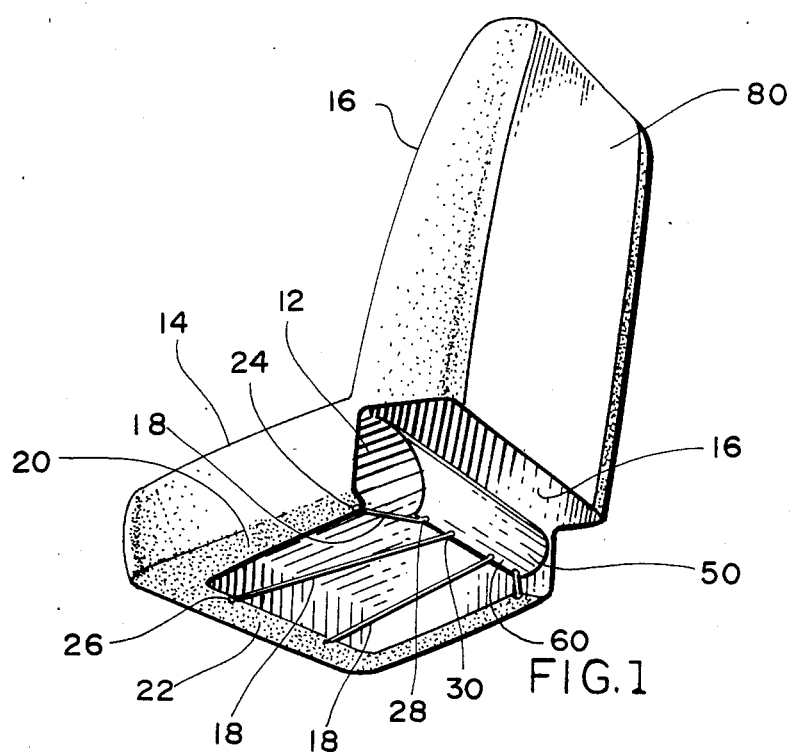
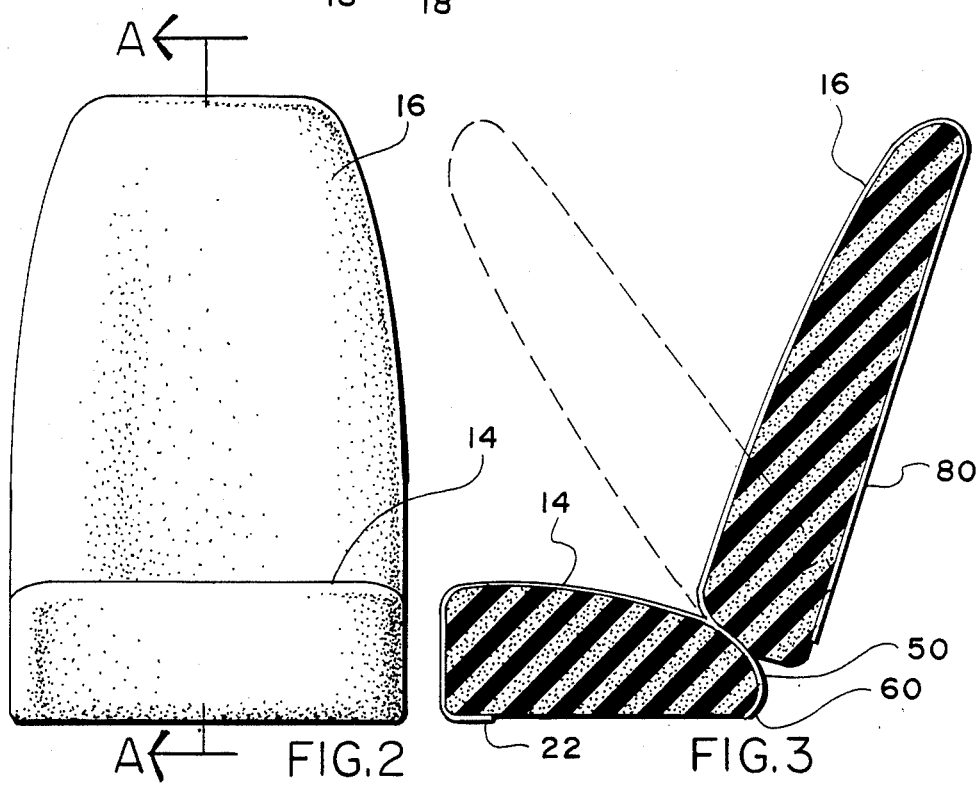

SEAT COVER

BACKGROUND OF THE INVENTION

1. Field of the Invention

This invention is directed to an article of manufacture. More specifically, this invention concerns itself with a one-piece seat cover for the automotive passenger seat.

2. Description of the Prior Art

Seat coverings for upholstered furniture and for automotive seats have been available and in use for a number of years. These seat covers provide not only protection against damage to the covered seat, but also, more recently, provide enhancements in finish and decorative appeal.

As can be fully appreciated, the design of an automotive seat cover (to be commercially viable) must reasonably accommodate different seats of different automobile manufacturers. In the automotive market, where design and style of automotive interiors is keenly competitive, the designer of the seat cover is presented with a unique set of problems. Not only must the seat covering be cut full enough to be "universal" in fit, but it must also be provided with a variety of means to maintain it taut and wrinkle-free and otherwise faithfully conform to the contours of the seat to which it is fitted.

This is typically achieved by providing a series of resilient straps, draw strings or restraints which fasten one portion of the seat covering to another, or to the seat itself, and thereby retain the covering in a relatively taut condition. Thus, when the individual seat is in use, the restraints provide some resiliency and permit the seat cover to stretch and conform to the seat while in use. Upon the passenger exiting the vehicle, the restraints will return the seat covering to its taut condition thereby preserving the neat and unruffled appearance to the automotive interior.

Where the means for maintaining the seat cover in conformance with the contours of the seat are attached to the seat itself, the seat covering tends to shift and creep. Thus, after the passenger exits the vehicle, the covering appears rumpled or has typically shifted and does not provide an aesthetically attractive appearance.

Various manufacturers of seat covers provide different solutions to this problem; with a number of these solutions being embodied in the patent literature: i.e., U.S. Pat. No. 3,804,457; 2,313,878; 4,103,968; 1,996,575.

U.S. Pat. No. 3,804,457 (assigned to Universal Oil Products Co.) describes and claims an improved seat cover for a bucket seat in which the back of the seat is pivotally mounted to the seat base. The seat covering described in this patent consists of essentially two distinct and independent components; one component designed for covering the seat back and a second component designed for covering the seat cushion. The seat back cover is further provided with two panels, one of which extends from the back of the seat cover and the other extends from the front of the seat back cover. Both of these panels are connected by different spring tensioning means to the base of the seat. The spring tensioning means maintain the seat back cover in a taut and unwrinkled condition while permitting the seat back to be moved to a more upright or reclining position without readjustment in the seat covering or in the means which maintain it in a taut and wrinkle-free condition.

U.S. Pat. No. 2,313,878 is similar in its disclosure to the '457 patent in that the seat back cover is provided with a hold down panel which presumably is positioned between the seat back and the base of the seat and thereby maintains the seat back cover in a taut condition.

U.S. Pat. No. 3,066,435 describes and claims a slip cover for upholstered furniture. The slip cover is retained in a taut and wrinkle-free condition on what appears to be an upholstered foot stool by a series of laces in combination with spring tensioning means. A lacing twine is simply strung back and forth between fasteners which are arranged on opposite sides of the seat covering. The end of each string tie or lace is further provided with a spring which is affixed to an eyelet of the covering. Once the laces are in place and the spring attached as described above, the laces maintain the slip cover in a taut and wrinkle-free condition; and, further provide continuous tensioning means to maintain that slip cover in such condition even after repeated use. This patent is noteworthy in that both the laces and the spring tensioning means are affixed exclusively to the seat covering and not to the seat cushion or the springs of the seat cushion.

As is evident from review of the foregoing references, the ability to maintain a seat cover or slip cover in a taut and wrinkle-free condition, is of concern to the designers of these products. These products must, out of necessity, provide at least as attractive an appearance as the seat to which they are fitted, in order to achieve commercial acceptance. In each of the patents discussed in detail above, various means were suggested to achieve this result. However, it is apparent that each of these expedients still suffer from significant shortcoming; the principal being that the covering for the seat cushion is free to creep or drift, since it has no anchor fixed point of reference. More specifically, in each instance where there is an attempt to provide a seat cover for a seat cushion, such cover simply drapes the seat cushion and is free to move about. The only alternative presented by the art to prevent such movement is to essentially permanently anchor the covering to the seat frame with a plurality of what is referred to as "hog rings". These rings, upon being crimped, permanently attach the seat cover to the structure of the seat. As one can appreciate, this can require removal of the seat to be performed effectively and, in any event, does not lend itself to installation without tools and moderate effort.

Because of the foregoing and other limitations, the design of seat coverings from relatively expensive, natural materials (i.e. leather, lamb skins, etc.) has been restricted to those products of custom design; namely, designed for a specific vehicle seat. The use of such natural materials has, thus, up to now, not lent itself to high volume production. More specifically, the lack of universality of fit of the covering and the differences in seat design have prevented mass production techniques from filling the demand, at a reasonable price, for the upscale market for this product.

Accordingly, the ability to provide a universal seat cover free from the disadvantages present in the art remains to be resolved. Up to now, the only two choices which have been available was either to accept some degree of movement of the seat cover (with the problems inherent in such design) or to permanently anchor the seat cover to the seat cushion.

OBJECTS OF THE INVENTION

It is the object of this invention to remedy the above as well as related deficiencies in the prior art.

More specifically, it is the principal object of this invention to provide a one-piece seat covering for an automotive passenger seat that is taut and wrinkle-free upon installation and will maintain itself as taut and wrinkle free after repeated use.

It is yet another object of this invention to provide a one-piece seat covering for an automotive passenger set in which both the seat back covering and the seat cushion covering have a common tensioning means.

It is still yet another object of this invention to provide a one piece seat covering for an automotive passenger seat in which the seat back portion thereof is resilient in multiple dimensions and thus capable of accommodating differences in seat design and yet maintain a taut and wrinkle-free appearance for the covering.

It is an additional object of this invention to provide a seat cover of natural skins and/or hides which can accommodate differences in seat design and yet maintain the taut and wrinkle-free appearance of a custom covering.

SUMMARY OF THE INVENTION

The above and related objects are achieved by providing a one piece seat covering having a trapezoidal shaped panel which extends from the inside seam which connects the seat cushion portion of the covering to the seat back portion of the covering. The longer of the two parallel sides of this trapezoidal panel is integrated within this inside seam. The panel is tapered, to substantially the same degree, on its unparallel sides. The panel is thus designed to extend from the inside seam of the covering through the gap between the seat cushion and seat back and terminates below the rear of the seat. This panel is further provided with a plurality of anchors and fasteners along the free edge thereof (i.e. grommets). A series of extensible resilient straps located along the free edge of the seat cushion portion of the covering, are then fastened or coupled to this panel by simple attachment of the free end of such straps to the anchors and fasteners located proximate to the free parallel edge of the trapezoidal panel.

In an alternative embodiment of this invention, the seat back portion of the covering is also modified by replacement of the rear panel of the seat back covering with a fabric panel capable of resilient stretch in essentially all directions. This modification permits the utilization of relatively expensive non-resilient natural seat covering materials (i.e. animal hides and skins) in seat coverings having universal fit. This resilient rear panel can also be provided with a seat pocket of comparable resiliency. The introduction of such a multi-stretch panel into the seat back portion of the covering now permits the adaptation of a single seat covering design, (executed in relatively non-resilient natural skins and hides), to a variety of seats of different shapes and sizes while still maintaining a custom tailored appearance to the seat covering.

BRIEF DESCRIPTION OF THE DRAWINGS

FIG. 1 is a rear perspective view of a automotive passenger seat which is fitted with the improved seat covering of this invention.

FIG. 2 is a front perspective view of the seat of FIG. 1.

FIG. 3 is a cross sectional view through the seat of FIG. 2 at line AA.

DESCRIPTION OF THE INVENTION INCLUDING PREFERRED EMBODIMENTS

Figures 4, 5:
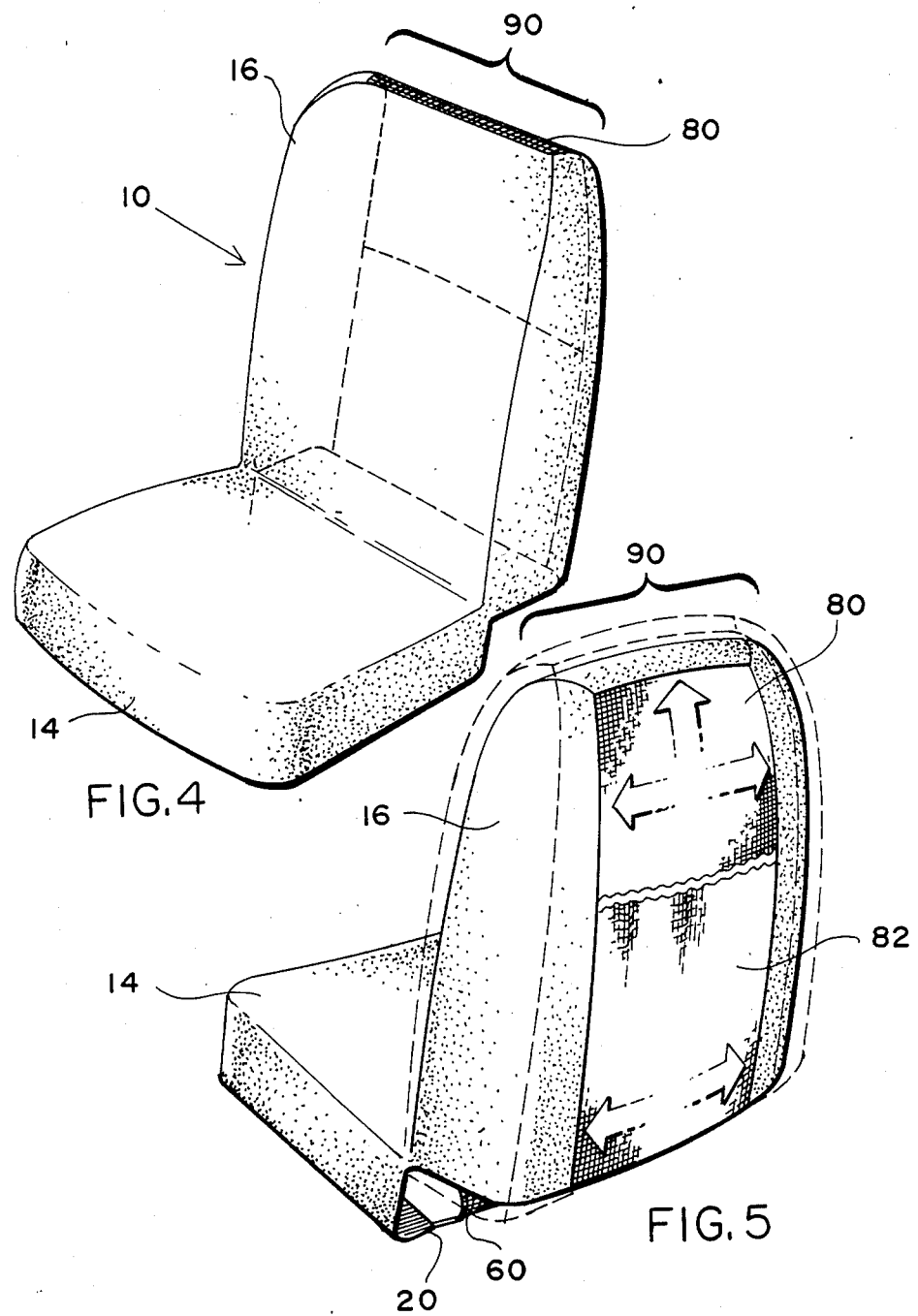
FIG. 4 is a front perspective view of an alternate configuration of the seat covering of FIG. 1.
FIG. 5 is a perspective view, from the rear, of an alternate embodiment of the seat covering illustrated in FIG. 4.

FIG. 1 illustrates the manner in which the seat covering (10) is fitted to an automotive passenger seat (12). The automotive seat comprises two essential parts, a seat cushion (14) and a seat back (16). Where this automotive seat is located in a two door automobile, the seat back may articulate, as shown in FIG. 3, to allow passengers to enter and egress the rear seat. The seat covering of this invention is installed on the automotive passenger seat by simply sliding the seat back portion of the covering over the seat back until properly positioned along with the seat cushion portion thereof, and anchoring it in place. In the embodiment of this invention illustrated in FIG. 1, a series of resilient straps (18) are attached to both the side (20) and front (22) portion of the seat cushion portion of the covering. These straps are fixably attached to the seat cushion portion of the covering at one end (24,26) and are provided, at the free end (28,30), with a series of hooks (not shown) or other fasteners. As illustrated in FIG. 1, these hooks and fasteners attach directly to a panel (50) of the seat covering. This panel is generally trapezoidal in shape and attached to the inside seam (52) which joins the seat cushion portion (14) of the covering to the seat back portion (16) of the covering. This panel (50) extends from the inside seam (52) of the covering through the gap between the seat back and seat cushion. It is generally sufficiently long enough to be capable of wrapping the rear portion of the cushion and extending under the seat cushion itself. The free edge of the trapezoidal panel which is essentially parallel to that portion which is attached to the inside beam, is provided with a series of complimentary elements (not shown) (i.e. grommets) capable of cooperatively engaging the fastening means on the free end of the resilient straps (28,30). In the embodiment of this invention illustrated in FIGS. 1 through 3, the resilient straps are stretched and engage the free edge of the trapezoidal panel (60) so as to maintain the seat portion of the covering in a taut and wrinkle-free condition. The tension exerted on this panel by these straps also serves to maintain the seat back portion of the covering in a relatively stationary position.

Seat coverings which are mass marketed are generally of limited design and fabricated of resilient or stretchable fabrics. This resiliency in the covering allows relatively few basic designs to accommodate virtually all sizes and shapes of automotive seats. Where the seat covering is fabricated from natural skins and/or hides, such universality in fit is lacking; the basic reason being the relative lack of stretch and/or resiliency ingerent in such materials. Accordingly, seat coverings prepared from such materials have up to now been limited to coverings specifically designed for specific makes of automotive seats.

The provision of a common tensioning means (50) for both the seat cushion and seat back portions of the covering now permits the adaptation of relatively inflexible, unstretchable covering materials to a seat covering of universal design. This enhancement is illustrated in FIGS. 4 and 5. It involves the replacement of a portion of the seat back covering of inflexible material, notably the rear panel (80) with a resilient material capable of stretching in multiple directions (80'). A pocket (82) is also provided in this panel. This pocket also possesses resilient characteristics similar to the panel. As illustrated in FIG. 5, this panel can be stretched in multiple directions. The dotted line indicates the extended position of the panel, in relation to the automotive seat. The resiliency of this back panel permits the panel to expand, or stretch along both its width and its length in the directions indicated by the arrows. Thus, the seat covering is drawn, or contoured to the automotive seat providing a custom fit look.

The ability to retain a custom appearance of the seat covering is also assisted by the manner in which the covering is tailored. The contours formed in the shoulder (90) of the seat covering, at the top of the seat back, are created in a manner similar in principle to the tailoring of a raglan sleeve. In essence, the combination of the multi-stretch panel and the tailored cut of the seat covering insures for a smooth and accommodating fit to different shapes and sizes of seat, thus, preserving a custom fit appearance in a universal seat cover.

The embodiments of this invention described hereinabove are simply illustrative of the basic concept of this invention and not intended as delineating its scope. The scope of this invention is set forth in the claims which follow.

What is claimed is:

1. In a one-piece seat cover having a seat cushion component and a seat back component joined to one another along a common seam, said common seam coinciding with the junction between the seat back and the seat cushion, the improvement comprising:
    (a) a trapezoidal panel integrated along the longer of the two parallel sides thereof into said one-piece seat cover at the inside seam which joins the seat back portion of the covering to the seat cushion portion of the covering, the shorter of the two parallel sides of said trapezoidal panel being provided with a series of anchors; and
    (b) a plurality of resilient, stretchable straps attached to the free edge of the seat cushion portion of the covering, said straps being provided on the free end thereof with means for fastening to anchors of the trapezoidal panel.

2. The improved seat cover of claim 1, wherein the seat back component of said covering comprises a front panel, two side panels and a rear panel, wherein said front and side panels are fabricated of relatively unstretchable materials and the rear panel of the back portion of the seat covering being fabricated from a multi-dimensional stretch material.

3. The improved seat cover of claim 2, wherein the rear panel is further provided with seat pocket having multi-dimensional stretch characteristics.

4. The improved seat cover of claim 2, wherein the side panels and front panel are joined together at the top of said covering so as to create a tailored contour which conforms to the seat back of the automotive seat.

* * * * *